United States Patent [19]
Fluckiger

[11] 3,762,104
[45] Oct. 2, 1973

[54] CONTROL DEVICE ON MACHINE TOOLS
[76] Inventor: Paul Fluckiger, Arzillier 6, Renens, Switzerland
[22] Filed: Nov. 22, 1971
[21] Appl. No.: 201,019

[52] U.S. Cl........ 51/165 R, 33/181 AT, 51/105 VG, 51/165.83
[51] Int. Cl........................................... B24b 49/04
[58] Field of Search.................... 33/181 AT, 168 R; 51/105 VG, 165 R, 165.83, 165.91

[56] References Cited
UNITED STATES PATENTS

| | | | |
|---|---|---|---|
| 1,763,201 | 6/1930 | Norman | 51/165.83 |
| 3,090,171 | 5/1963 | Stimson | 51/165 R |
| 2,718,100 | 9/1955 | Hjarpe | 51/165.91 |
| 2,010,706 | 8/1935 | Williams | 51/165.91 |

*Primary Examiner*—Harold D. Whitehead
*Attorney*—John J. McGlew et al.

[57] ABSTRACT

The control device is useful on material removing machine tools, such as grinders, for producing a conical surface on rotating bodies of revolution, particularly disc valve bodies, having a reference surface perpendicular to the axis of rotation. The device comprises a measuring fork having facing stops, engageable with the conical surface and the reference surface of the workpiece, respectively, and spaced apart a preselected distance. This fork is on the lower end of a freely pivoted arm which is swingable about a pivot axis parallel to the axis of rotation of the workpiece and preferably included in a vertical plane including the axis of rotation of the workpiece. An adjustable spring biases the arm to swing the fork in a direction to press the stops against the respective workpiece surfaces during machining of the conical surface, and the spring biases the fork to swing through and beyond such vertical plane when the conical surface and the reference surface of the workpiece have the preselected distance from each other. A feeler or the like may be associated with the arm to engage a control element to interrupt the machining operation at such time. A retracting arrangement is provided to swing the fork back to its starting position.

10 Claims, 4 Drawing Figures

Patented Oct. 2, 1973

3,762,104

INVENTOR.
PAUL FLUCKIGER
BY John J. McGlew
ATTORNEY

CONTROL DEVICE ON MACHINE TOOLS

FIELD OF THE INVENTION

This invention relates to material removing machine tools and, more particularly, to a novel control device operable to determine when a conical surface of a workpiece has a predetermined spacing from a reference surface of a workpiece, which reference surface is in a plane perpendicular to the axis of rotation of the workpiece being machined.

BACKGROUND OF THE INVENTION

As is known to those skilled in the art, conical surfaces, serving as a seat for disc valve bodies, must be arranged at a predetermined distance or spacing from the plane end faces of such valve bodies. In the production of such conical surfaces, for example by grinding, it is customary to interrupt the operation from time-to-time in order to check the relative spacing of the two surfaces from each other. This is not only cumbersome but also results in relatively long production times, with reduced output per unit of time.

It has already been suggested to measure the distance or spacing between the surfaces in question, during the machining process, by measuring the distance of the conical surface from the free end of the valve shaft and determining therefrom the desired distance between the conical surface and such shaft end face. Such an indirect measurement requires an otherwise unnecessarily precise manufacturing of the shaft end, and errors are always possible.

SUMMARY OF THE INVENTION

The present invention is directed to the problem of eliminating the disadvantages of the known prior art measures and to providing a control device which measures the distance between the conical surface and the reference surface, or the spacing between these two surfaces, constantly and directly and which permits, in addition, automatic interruption of the removal of material from the conical surface when the latter has the predetermined spacing from the reference surface.

To this end, the control device embodying the invention is in the form of a measuring fork having stops facing each other and having a predetermined spacing from each other. This measuring fork is suspended, for free swinging, on a swinging axis which is parallel to the axis of rotation of the workpiece, and is so biased that it is held, against the bias, by the bearing of the workpiece reference surface and the workpiece conical surface against the respective stops until the measuring fork is swung, under its bias, when the predetermined spacing of the workpiece surfaces is attained, beyond the axis of rotation of the workpiece. Preferably the arrangement is such that the fork actuates feelers or switches, when it is so swung away, to interrupt the machining operation of the machine on which the control device is mounted.

Since the measuring fork, acting as a gauge, cooperates directly with the surfaces whose spacing has to be checked, sources of error are practically eliminated and, since the machining operation can be interrupted when the predetermined spacing, corresponding to the spacing of the stops of the fork is attained, a maximum of precision is assured with respect to each individual workpiece being machined.

An object of the invention is to provide a control device on material removing machine tools for producing a conical surface on bodies of revolution.

Another object of the invention is to provide such a control device which eliminates the disadvantages of known measures for determining whether such a conical surface has a predetermined spacing from a reference surface which is perpendicular to the axis of rotation of the body of revolution.

A further object of the invention is to provide such a control device which measures the spacing of the conical surface, being machined, from the reference surface constantly and directly.

Another object of the invention is to provide such a control device operable to interrupt removal of material from the conical surface when the latter has the predetermined spacing from the reference surface.

For an understanding of the principles of the invention, reference is made to the following description of a typical embodiment thereof as illustrated in the accompanying drawing.

DESCRIPTION OF THE PREFERRED EMBODIMENT

Figure 1:
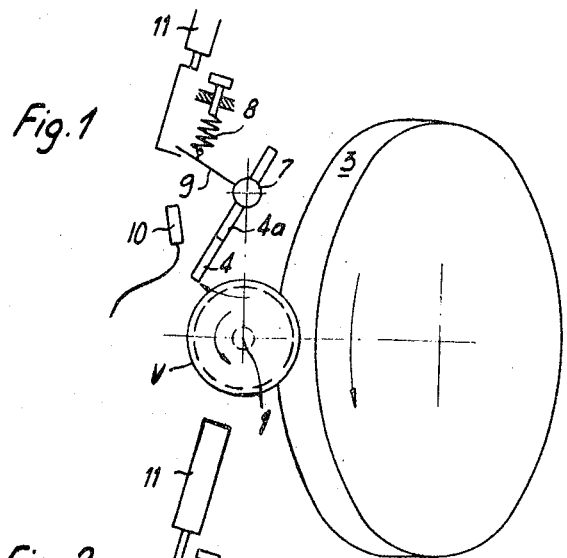
FIGS. 1, 2 and 3 are front views illustrating the control device in three respectively different positions of the measuring fork.

The control device is illustrated in the drawings as associated with a grinding machine for producing a conical seat for disc valve bodies V. The workpiece holder 2 rotates about an axis 1, and the grinding disc is illustrated at 3. The control device has a pivot 7 mounted in the machine and lying in a vertical plane extending through the axis of rotation 1 of the workpiece holder 2, the axis of pivot 7 being above the axis of rotation 1 and extending parallel to the axis of rotation 1. Pivot 7 pivotally supports a swinging arm 4a which carries, at its lower end, a measuring fork 4. The length of this swinging arm 4a, and its position on pivot 7, particularly axially of pivot 7, are adjustable.

Figure 2:
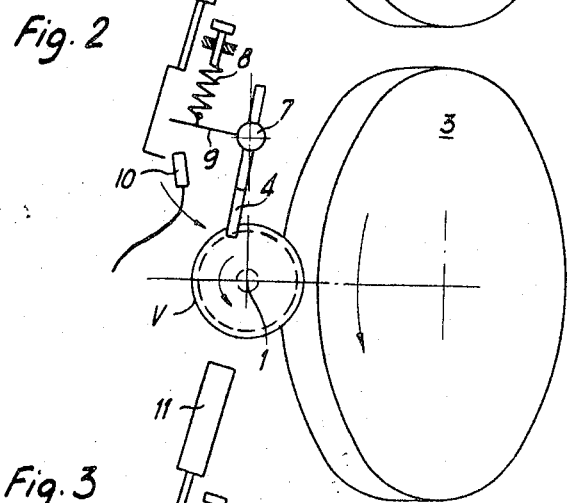
Figure 4:
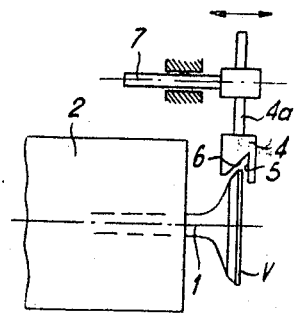
FIG. 4 is a partial side elevation view of the control device and illustrating the measuring fork in the position shown in FIG. 2.
Figure 3:
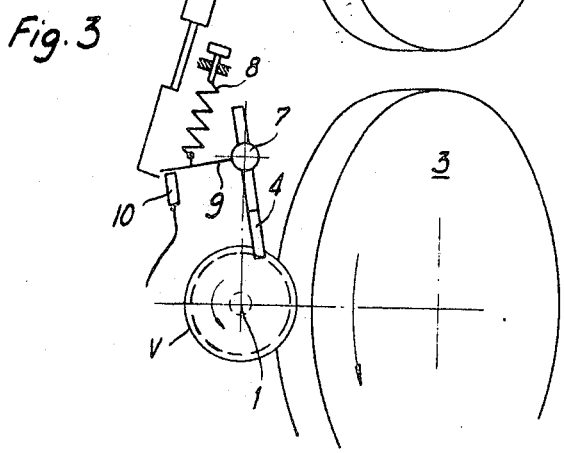

As best seen in FIG. 4, the surfaces of the two arms of fork 4, facing each other, carry respective stops. Stop 5 is adapted to cooperate with the plane end surface of valve body V, which end surface extends perpendicular to the axis of rotation 1. Stop 6 is adapted to cooperate with the conical seat being produced by the grinding machine. The distance between stops 5 and 6, or their spacing, corresponds exactly to the desired distance of the conical seat from the end face of valve body V, or to the desired spacing between these surfaces. As best seen in FIGS. 1, 2 and 3, a control arm 9 extends from the pivotal mounting 7 of swinging arm 4a and in the pivoting plane of measuring fork 4. A compression spring 8 has one end bearing against control arm 9 and the other end is adjustable to preselect the effective bias of compression spring 8. The arm 9 is adapted to cooperate with a feeler 10 associated with the driving control of the grinding machine, and a holding device 11 is also associated with arm 9 and serves as means to return measuring fork 4 to the rest position shown in FIG. 1 and to retain fork 4 in this rest position.

The method of operation of the control device, described above, will now be explained. With measuring fork 4 in its rest position shown in FIG. 1, and in which it is completely outside the range of workpiece V with spring 8 highly compressed, valve body V is inserted into work holder 2. After the grinding machine is started, measuring fork 4, which is set to the plane of the valve disc by shifting holding device 11, is released, as shown in FIG. 2, so that it strikes still outside the vertical plane including the axes 1 and 7 and against valve disc V, since the distance of the end face of valve disc V from its conical seat, at the start of machining of the conical seat by grinding disc 3, is still greater than the distance between the two measuring fork stops 5 and 6 forming the theoretical or desired distance.

With increasing removal of material from the conical seat of the valve body, measuring fork 4 moves slowly, under the bias of spring 8, out of the above indicated initial pivotal position toward the vertical plane through axes 1 and 7. This plane is reached, by measuring fork 4, exactly when the end face and the conical seat of valve disc V have the spacing of the measuring fork stops 5 and 6. At the same time, any blocking of the pivoting movement of measuring fork 4 by valve disc V is eliminated, so that spring 8 suddenly turns swinging arm 4 beyond valve disc V, in a counterclockwise direction as viewed in the drawing, into the disconnecting position shown in FIG. 3. In this position, arm 9 actuates feeler or switch 10 for the purpose of interrupting the machining operation.

A sufficiently sensitive, or briefly responding, feeler or switch 10 assures that the spacing of the seating surface from the end face of each valve disc leaving the machine has the theoretical value predetermined by measuring fork 4. Thus intermediate checking or after checking is not necessary. Instead of spring 8 for biasing the measuring fork, a weight could be used to provide the bias for measuring fork 4, such a weight being secured, for example, on arm 4a or on arm 9. A special advantage of the described device is its simple construction and, thanks to the adjustability of the length of arm 4a and its position along the axis 7, the device is readily adaptable to different sizes of valve discs.

While a specific embodiment of the invention has been shown and described in detail to illustrate the application of the principles of the invention, it will be understood that the invention may be embodied otherwise without departing from such principles.

What is claimed is:

1. Control device on material-removing machine tools for producing a conical surface on rotating workpiece bodies of revolution, particularly disc valve bodies, having a reference surface perpendicular to the axis of rotation: said control device comprising, in combination, a measuring fork having facing stops at a free end thereof spaced apart a preselected distance; pivot means suspending said fork, at a point spaced radially from its free end, for freely swinging about a pivot axis parallel to the axis of rotation of the workpiece; one of said stops having a work-engaging surface in a plane perpendicular to said pivot axis, for engagement with said reference surface, and the other stop having a work-engaging surface in a plane diverging from said perpendicular plane at an angle equal to the desired angle of said conical surface to said reference surface of the workpiece, for engagement with said conical surface; and means biasing said fork to swing said stops about its pivot axis in a direction toward a common plane including said rotation and pivot axes to press said stops against the respective workpiece surfaces at a point in advance of said common plane during machining of said conical surface; said biasing means swinging said fork through and beyond said common plane when said conical surface and said reference surface have said preselected distance from each other and said desired angle relative to each other.

2. Control device on material-removing machine tools, as claimed in claim 1, including means operatively associated with said measuring fork and effective to interrupt operation of the machine tool responsive to said measuring fork being swung through and beyond said vertical plane.

3. Control device on material-removing machine tools, as claimed in claim 2, in which said last-named means is a feeler.

4. Control device on material-removing machine tools, as claimed in claim 2, in which said last-named means is a switch.

5. Control device on material-removing machine tools, as claimed in claim 2, in which said pivot means includes a swinging arm swingable about said pivot axis and carrying said measuring fork at a free end.

6. Control device on material-removing machine tools, as claimed in claim 5, in which the length of said swinging arm is adjustable.

7. Control device on material-removing machine tools, as claimed in claim 5, in which said swinging arm is adjustable axially of said pivot axis.

8. Control device on material-removing machine tools, as claimed in claim 5, including an operating arm extending from said swinging arm in the pivoting plane of said swinging arm; said biasing means being operable on said swinging arm.

9. Control device on material-removing machine tools, as claimed in claim 8, in which said biasing means comprises a compression spring engaged with said operating arm.

10. Control device on material-removing machine tools, as claimed in claim 9, including a retaining device engageable with said operating arm and operable to restrain said measuring fork in an inoperative rest position.

* * * * *